(12) United States Patent
Williams et al.

(10) Patent No.: US 11,084,996 B2
(45) Date of Patent: Aug. 10, 2021

(54) TWO-STAGE GASIFIER AND GASIFICATION PROCESS WITH FEEDSTOCK FLEXIBILITY

(71) Applicant: LUMMUS TECHNOLOGY LLC, Bloomfield, NJ (US)

(72) Inventors: Chancelor L. Williams, Katy, TX (US); Albert C. Tsang, Sugar Land, TX (US); Philip Rodney Amick, Pearland, TX (US); Jayesh Shah, Sugar Land, TX (US); Paul Edgar Michaud, Houston, TX (US); Shrinivas Lokare, Sugar Land, TX (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 2 days.

(21) Appl. No.: 16/154,420

(22) Filed: Oct. 8, 2018

(65) Prior Publication Data
US 2019/0100707 A1   Apr. 4, 2019

Related U.S. Application Data

(62) Division of application No. 15/449,216, filed on Mar. 3, 2017, now Pat. No. 10,093,876.

(Continued)

(51) Int. Cl.
*C10J 3/72* (2006.01)
*C01B 3/36* (2006.01)
(Continued)

(52) U.S. Cl.
CPC ............... *C10J 3/721* (2013.01); *C01B 3/36* (2013.01); *C10J 3/485* (2013.01); *C10J 3/506* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2,766,073 A | * | 10/1956 | Bergstrom | B01J 8/12 239/456 |
| 3,367,384 A | * | 2/1968 | Voorheis | F23D 11/10 431/9 |

(Continued)

FOREIGN PATENT DOCUMENTS

| | | |
|---|---|---|
| JP | S58-194986 | * 11/1983 |
| JP | S58-194986 A | 11/1983 |

(Continued)

OTHER PUBLICATIONS

Extended European Search Report issued in European Application No. 17760794.2, dated Oct. 22, 2019 (14 pages).

(Continued)

*Primary Examiner* — Kaity V Chandler
(74) *Attorney, Agent, or Firm* — Osha Bergman Watanabe & Burton LLP

(57) ABSTRACT

A two-stage gasification reactor may include a reactor lower section and a reactor upper section. The reactor lower section may include (a) a lower reactor body, (b) two primary feed nozzles, configured to introduce at least one of a dry feedstock or a first slurried feedstock and located on opposing terminal ends of the lower reactor body, and (c) at least two secondary feed nozzles, configured to introduce a liquid hydrocarbon feedstock, located on the lower reactor body. The reactor upper section may include (a) an upper reactor body, (b) at least one upper feed nozzle, configured to introduce at least one of a dry feedstock or a first slurried feedstock, located on the upper reactor body, and (c) an outlet.

13 Claims, 4 Drawing Sheets

Related U.S. Application Data

(60) Provisional application No. 62/303,628, filed on Mar. 4, 2016.

(51) Int. Cl.
*C10J 3/48* (2006.01)
*C10J 3/50* (2006.01)

(52) U.S. Cl.
CPC .............. *C01B 2203/025* (2013.01); *C01B 2203/0216* (2013.01); *C01B 2203/0255* (2013.01); *C01B 2203/1235* (2013.01); *C10J 2200/152* (2013.01); *C10J 2300/093* (2013.01); *C10J 2300/094* (2013.01); *C10J 2300/0926* (2013.01); *C10J 2300/0943* (2013.01); *C10J 2300/0989* (2013.01); *C10J 2300/1656* (2013.01); *C10J 2300/1671* (2013.01); *C10J 2300/1846* (2013.01)

(56) References Cited

U.S. PATENT DOCUMENTS

| | | | | |
|---|---|---|---|---|
| 3,701,827 A * | 10/1972 | Dahmen | ............... | C09C 1/50 423/456 |
| 3,743,606 A * | 7/1973 | Marion et al. | ......... | C01B 3/363 252/373 |
| 3,847,564 A * | 11/1974 | Marion | ............... | C01B 3/363 48/95 |
| 4,169,128 A * | 9/1979 | Sinor | ............... | C10G 1/06 422/224 |
| 4,343,627 A * | 8/1982 | Tanca | ............... | C10J 3/54 48/202 |
| 4,371,378 A * | 2/1983 | Brent | ............... | C01B 3/363 239/132.3 |
| 4,377,394 A * | 3/1983 | Muenger | ............... | B01D 45/08 122/5 |
| 5,061,457 A * | 10/1991 | Hsieh | ............... | B01J 8/18 422/140 |
| 5,242,577 A * | 9/1993 | Betts | ............... | B01F 5/0405 208/113 |
| 5,306,418 A * | 4/1994 | Dou | ............... | B01J 8/1827 208/157 |
| 6,936,227 B1 * | 8/2005 | De Souza | ............... | C10G 11/18 239/434.5 |
| 2010/0040510 A1 * | 2/2010 | Randhava | ............... | C01B 3/025 422/140 |
| 2014/0061539 A1 | 3/2014 | Balasubramaniyan et al. | | |
| 2016/0002125 A1 * | 1/2016 | Luo | ............... | C07C 2/08 585/447 |

FOREIGN PATENT DOCUMENTS

| | | |
|---|---|---|
| JP | S61-228093 A | 10/1986 |
| JP | S62-131094 A | 6/1987 |
| JP | 2015-525810 A | 9/2015 |
| WO | 2009/093098 A2 | 7/2009 |
| WO | 2009095365 A2 | 8/2009 |

OTHER PUBLICATIONS

Office Action issued in corresponding Japanese Application No. 2018-546522 dated Jul. 16, 2019, and English translation thereof (6 pages).

Office Action issued in corresponding CO Application No. NC2018/0010347 dated Feb. 8, 2021 (13 pages).

* cited by examiner

TWO-STAGE GASIFIER AND GASIFICATION PROCESS WITH FEEDSTOCK FLEXIBILITY

CROSS-REFERENCE TO RELATED APPLICATIONS

This application claims priority to U.S. Patent Application No. 62/303,628 filed on Mar. 4, 2016, which is incorporated herein by reference.

BACKGROUND

Gasification processes are widely used to convert solid or slurried feedstocks such as coal, petroleum coke and petroleum residue into synthesis gas. Synthesis gas is predominantly composed of hydrogen gas ($H_2$) and carbon monoxide (CO), and is utilized both as fuel for the production of electricity, as well as a feedstock for producing chemicals such as hydrogen, methanol, ammonia, synthetic/substitute natural gas or synthetic transportation oil. Three basic types of system and processes have been developed for the gasification of carbonaceous materials. They are: (1) fixed-bed gasification, (2) fluidized-bed gasification, and (3) suspension or entrainment gasification. Embodiments herein relate to the third type of system and, more particularly, embodiments presented herein relate to a two-stage entrained gasification system and process for gasifying carbonaceous materials.

The possibilities presented by the two-stage gasifier design can be exploited by maximizing the slurry feed rate to the lower temperature second stage, thereby utilizing the heat generated in the first stage gasifier to evaporate water from the slurry. The char and unconverted carbon exiting the second stage gasifier are then separated and recycled back to the first stage gasifier in dry form, thus minimizing the amount of oxygen required in the higher temperature first stage and maximizing the conversion efficiency of the gasifier.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a gasification process that includes (a) introducing a liquid hydrocarbon feedstock and at least one of a dry feedstock or a first slurried feedstock into a reactor lower section, wherein the at least one dry feedstock or first slurried feedstock is introduced through two primary feed nozzles while the liquid hydrocarbon feedstock is introduced through at least two secondary feed nozzles; (b) partially combusting the feedstocks in the reactor lower section with a gas stream comprising an oxygen-containing gas or steam to evolve heat and form products comprising hot synthesis gas; (c) passing said hot synthesis gas from step (b) upward into a reactor upper section; (d) and introducing a second slurried feedstock into said reactor upper section, whereby heat from said hot synthesis gas supports reaction of the second slurried feedstock by pyrolysis and gasification reactions.

In another aspect, embodiments disclosed herein relate to a two-stage gasification reactor that includes a reactor lower section that includes a lower reactor body; two primary feed nozzles, configured to introduce at least one of a dry feedstock or a first slurried feedstock, located on opposing terminal ends of the lower reactor body; and at least two secondary feed nozzles, configured to introduce a liquid hydrocarbon feedstock, located on the lower reactor body; a reactor upper section that includes an upper reactor body; at least one upper feed nozzle, configured to introduce at least one of a dry feedstock or a first slurried feedstock, located on the upper reactor body; and an outlet.

In yet another aspect, embodiments disclosed herein relate to a method for improving a two-stage gasification reactor that includes installing at least two secondary feed nozzles on a lower reactor body for introducing a liquid hydrocarbon feedstock into the lower reactor body to supplement a primary feedstock comprised of a dry feedstock or a slurried feedstock that is introduced through a primary feed nozzle.

Other aspects and advantages of the claimed subject matter will be apparent from the following description and the appended claims.

DETAILED DESCRIPTION

In one aspect, embodiments disclosed herein generally relate to a gasification process that converts carbonaceous feedstock into desirable gaseous products such as synthesis gas. In more particular aspects, embodiments disclosed herein relate to a gasification process with feedstock flexibility when converting carbonaceous materials into desirable gaseous products. For instance, in one or more embodiments, a gasification process disclosed herein may utilize a liquid hydrocarbon feedstock and at least one of a dry feedstock or a slurried feedstock simultaneously within the reaction chamber of a gasifier.

Figure 1:
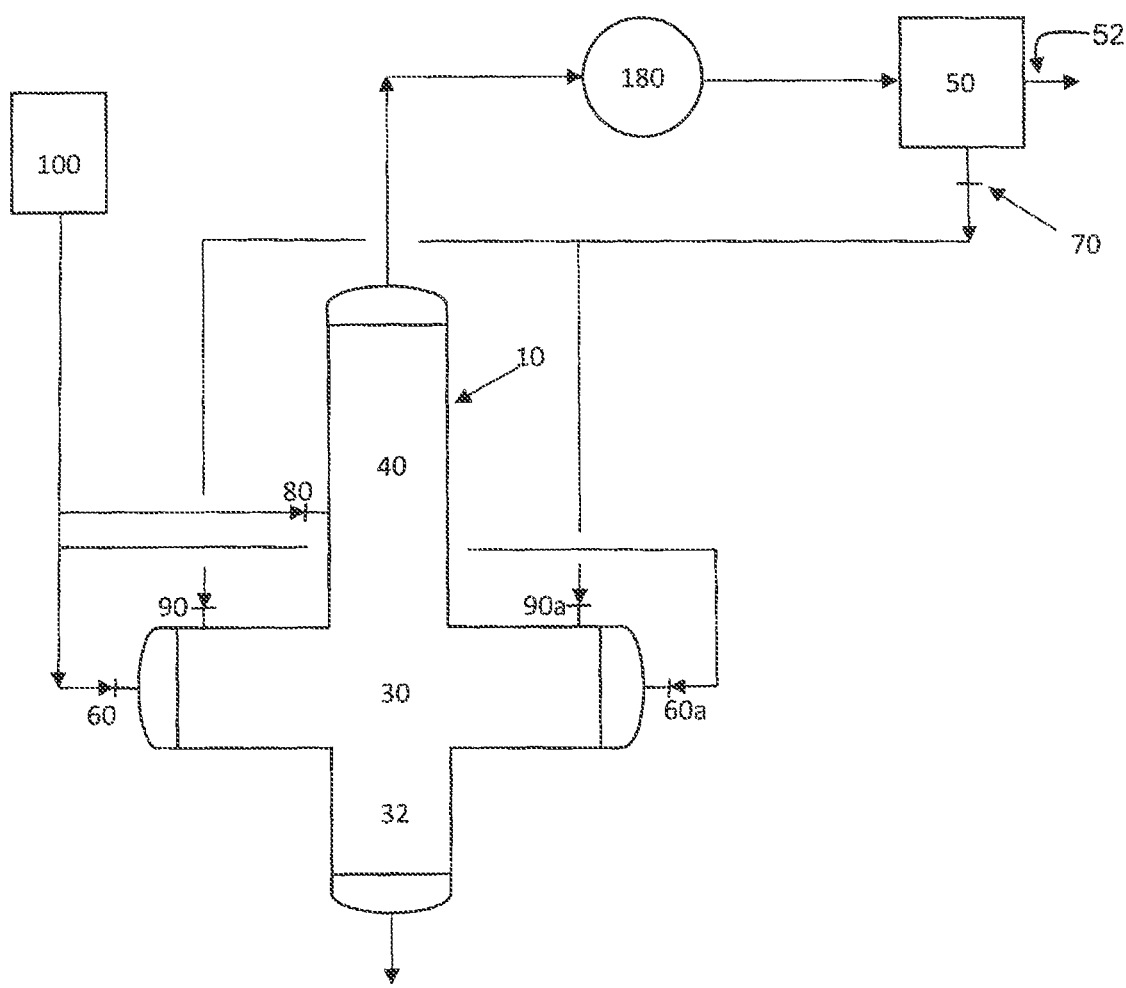
FIG. 1 is a schematic representation of a gasification system employing a conventional two-stage gasification reactor.

Referring to FIG. 1, an embodiment of a gasification system employing a conventional two-stage gasification reactor is shown, indicated generally by reference numeral 10. The gasification system has a reactor lower section 30 and a reactor upper section 40. The first stage of the gasification process takes place in the reactor lower section 30 and the second stage of the gasification process takes place in the reactor upper section 40. The reactor lower section 30 defines the first stage reaction zone, and will alternatively be referred to as the first stage reaction zone. The reactor upper section 40 defines the second stage reaction zone, and will alternatively be referred to as the second stage reaction zone.

Referring to FIG. 1, a gasification process generally begins within the first reaction zone (or reactor lower-section 30), when a dried or slurried carbonaceous feedstock is mixed with a gas stream comprising an oxygen-containing gas and/or steam and a rapid exothermic reaction takes place in which the carbonaceous feedstock is converted into a first mixture product comprising steam, hydrogen, carbon monoxide, carbon dioxide, methane, and entrained particulates such as ash. Ash being comprised of the non-combustible mineral content of the carbonaceous feedstock. In one or more embodiments, a solid carbonaceous feedstock may be pulverized (by methods that are known in the art, but outside the scope of this disclosure), and in some instances slurried, before entering a feeding system 100 such as, but not limited to, a lock-hopper system. The pulverized solid stream comprising particulate carbonaceous material from the feeding system 100 is injected into the gasification reactor 10 lower section 30 through feed nozzles 60 and/or 60a. The temperature of the first reaction zone 30 is maintained higher than the ash melting point, which allows the ash to melt and agglomerate to form a viscous liquid known as slag. The slag falls to the bottom of the reactor lower-section 30 and flows into a quench chamber 32, whereupon it is water quenched and directed to a slag processing system (not shown) for final disposal.

The primary combustion reaction occurring in the first reaction zone is:

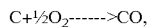

which is highly exothermic. The exothermicity of the reaction raises the temperature in the first reaction zone to between 2000° F. and 3500° F. The heat produced in the first reaction zone is carried upward with the gas stream, thereby providing heat for pyrolysis reactions that occur in the unfired second reaction zone, including vaporization of the feed water, the carbon-steam reaction and the water-gas reaction between CO and $H_2O$. The carbon-steam reaction forms CO and $H_2$, thus, increasing the yield of these usable gases.

Concerning the reactor upper section 40, according to the embodiment depicted in FIG. 1, solid carbonaceous feedstock may be pulverized (by methods that are known in the art, but outside the scope of this disclosure), and in some instances slurried, before entering feeding system 100, also used to feed reactor lower section 30. The pulverized solid stream comprising particulate carbonaceous material from the feeding system 100 may be injected into the gasification reactor 10 upper section 40 through upper feed nozzle 80, or additional feed nozzles (not shown). The carbonaceous material then comes into contact with the hot syngas rising from (and produced within) the gasification reactor 10 lower section 30. The carbonaceous material entering the upper section 40 is dried and a portion of it is pyrolyzed and gasified via reactions such as the carbon steam reaction ($C+H_2O\text{------>}CO+H_2$). Pyrolysis and gasification reactions are endothermic, thus, the temperature of the mixture of carbonaceous material and syngas decreases as the mixture travels upwards through the upper section 40. By the time the second mixture product comprising un-reacted solid particulates (e.g. char) and a second gaseous product stream (e.g. syngas) leaves the top of the upper section 40 of the gasifier 10, the second mixture product temperature drops to the range between 1200° F. and 2500° F., such as within the range between 1500° F. and 2000° F.

Further according to the embodiment as shown in FIG. 1, the second mixture product, produced in the reactor upper section and comprising un-reacted solid particulates and a second gaseous product stream, exits the reactor upper section 40 and is sent to a heat recovery unit 180. Subsequently, the cooled syngas is introduced to a particulate filtering device 50. Within the particulate filtering device 50, the second solid product stream is separated and withdrawn via an outlet 70. The second solid product stream (primarily including char) may then be recycled back to the reactor lower section 30 of the gasifier 10 via feed nozzles 90 and 90a and used to supplement the carbonaceous feedstock introduced therein from feed nozzles 60 and 60a.

Further referring to FIG. 1, the gaseous product stream 52 exiting from the particulate filtering device 50 comprises hydrogen, carbon monoxide, a small amount of methane, hydrogen sulfide, ammonia, nitrogen, and carbon dioxide, which constitutes the process product. In one or more embodiments, the process product stream exits particulate filtering device 50 to undergo further processing (e.g., separations, scrubbing, etc.) for end-use applications.

Figure 2:
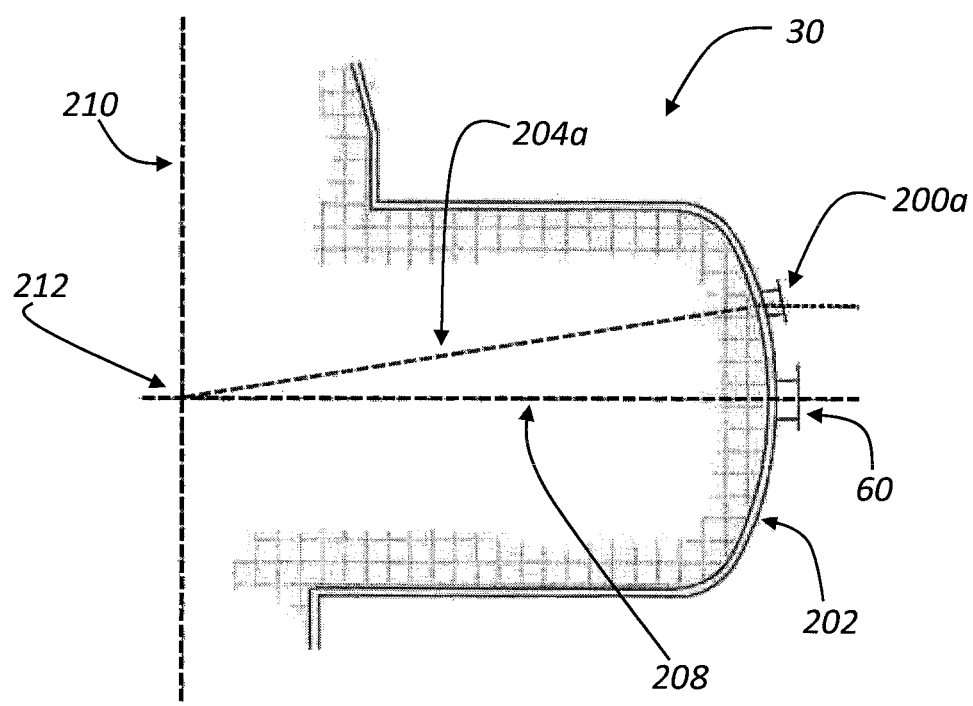
FIG. 2 is a side perspective view of one half of a lower section of a two-stage gasification reactor of an embodiment of the present disclosure.
Figure 3:
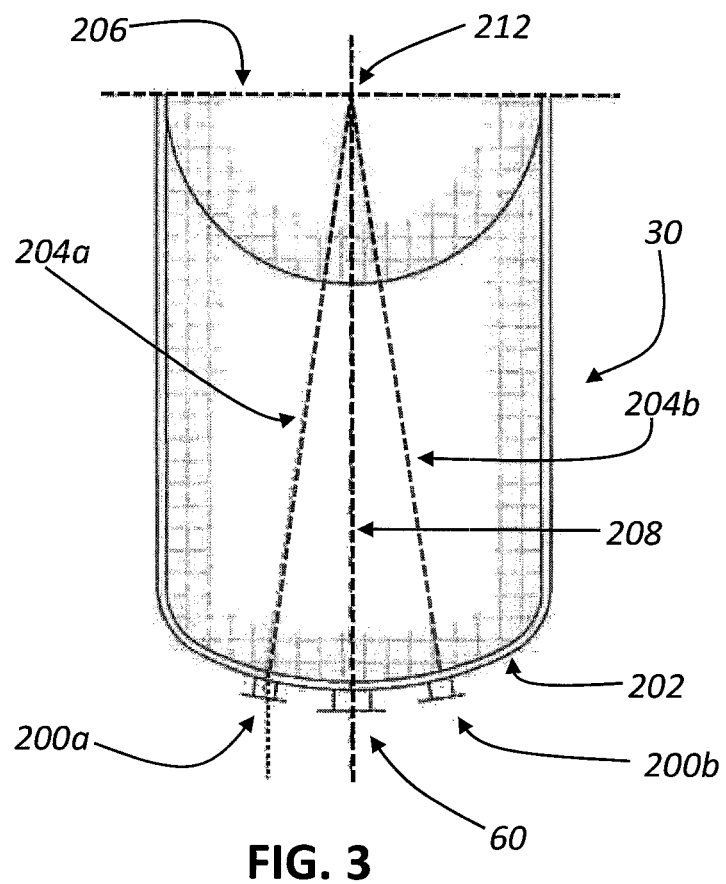
FIG. 3 is a top perspective view of one half of a lower section of a two-stage gasification reactor of an embodiment of the present disclosure.
Figure 4:
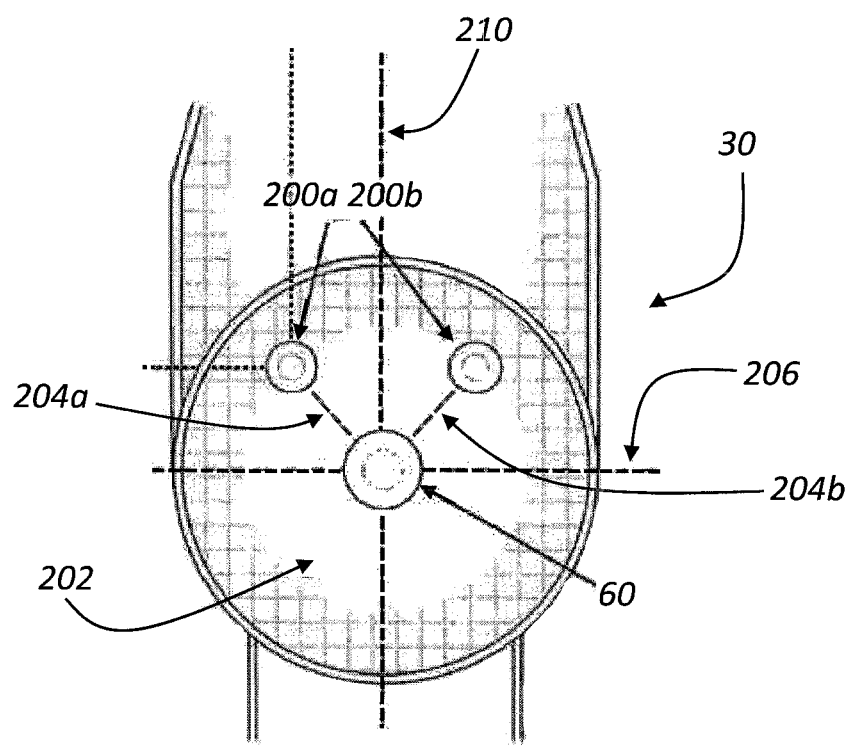
FIG. 4 is an end perspective view of one half of a lower section of a two-stage gasification reactor of an embodiment of the present disclosure.

Referring now to FIGS. 2-4, embodiments of the present disclosure will be explained in further detail. In general, the reactions occurring within the gasification reactor are the same as what has been described above, although the gasification reactor and its operation have been modified to improve feedstock flexibility. Shown in FIGS. 2-4 are perspective views of one half of a lower section 30 of a two-stage gasification reactor, with FIG. 2 depicting a side view, FIG. 3 depicting a top view, and FIG. 4 depicting an end view. Included in these views are dashed lines for an x, y, z cartesian coordinate system (i.e., 206, 208, and 210 for the x,y,z axes, respectively) with its origin 212 centrally located within the lower section 30 of the two-stage gasification reactor, the x-axis 206 spanning the depth of the reactor lower section, the y-axis 208 spanning the length of the reactor lower section, and the z-axis 210 vertically oriented from the origin 212 through the center of the reactor upper section 40. This coordinate system will be useful to help fully explain details of the two-stage gasification reactor design.

According to some embodiments of the present disclosure, a primary feed nozzle 60 may be centrally located, substantially in line with y-axis 208, on each of the terminal ends 202 of the horizontal lower section 30 of the two-stage gasification reactor. The primary feed nozzle 60 may introduce the dry or slurried carbonaceous feedstock into the lower section 30 of the reactor so that the feedstock may be reacted via combustion processes described above. In addition to the primary feed nozzle 60, in some embodiments, there may be at least two secondary feed nozzles 200a and 200b with at least one secondary feed nozzle located on each of the terminal ends 202 of the horizontal lower section 30 of the two-stage gasification reactor.

In one or more embodiments, there may be at least two secondary feed nozzles, such as one located on each of the terminal ends 202 of the horizontal lower section 30 of the two-stage gasification reactor. In some embodiments, there may be two secondary feed nozzles at each of the terminal ends 202 for a total of four secondary feed nozzles. The secondary feed nozzles 200a (and 200b if present) may introduce a secondary liquid hydrocarbon feedstock into the lower section 30 of the reactor so that it may be reacted by combustion processes as described above. In some embodiments, the secondary liquid hydrocarbon feedstock and the primary dry or slurried carbonaceous feedstock may be introduced into the lower section 30 of the reactor substantially simultaneously. In other embodiments, the introduction of the secondary liquid hydrocarbon feedstock into the lower section 30 of the reactor may occur intermittently, while the introduction of the primary dry or slurried carbonaceous feedstock may be continuous while the gasification reactor is in operation. In one or more embodiments, there may be substantially no introduction of primary dry or slurried carbonaceous feedstock into the lower section 30 via primary feed nozzles 60 and 60a. In these embodiments, a dry or slurried carbonaceous feedstock may be provided to upper section 40 by nozzle 80 and the lower section 30 may be fed the recycled dry char and ash produced by the upper section 40 by feed nozzles 90 and 90a along with secondary liquid hydrocarbon feedstock provided by secondary feed nozzles 200a and 200b.

Further, and as illustrated in FIGS. 2-4, the secondary feed nozzles 200a and 200b are designed to introduce the liquid hydrocarbon feedstock via secondary feed vectors 204a and 204b into the lower section 30 of the reactor so that the liquid hydrocarbon feeds maintain a vertical symmetry within the lower section 30 of the reactor with the primary feed vector, approximated by the y-axis marker 208, of the primary feed nozzle 60. The design of the secondary feed nozzles 200a and 200b, including their respective placement on the terminal ends 202 of the horizontal lower section 30 of the two-stage gasification reactor and their feed vector 204a and 204b orientation, is an important engineering consideration in order to create optimal flow and temperature profiles within the gasification reactor by minimizing disturbance to the feedstock flow along the primary feed vector (i.e., the y-axis marker 208) of the primary feed nozzle 60, while avoiding plugging or other damage that may be caused by accumulated ash material. For example, in some embodiments a design of the primary feed nozzle 60 and secondary feed nozzles 200a and 200b will allow for the primary feed vector (i.e., the y-axis marker 208) from the primary feed nozzle 60 and the secondary feed vectors 204a and 204b, from secondary feed nozzles 200a and 200b, to intersect at a feed intersection point, approximated by the origin 212 of the coordinate system. In one or more embodiments, the feed intersection point (i.e., origin 212) may be centrally located within the lower section 30 of the reactor at the point where the primary feed vector (i.e., the y-axis marker 208), the x-axis marker 206, and the z-axis marker 210 meet.

However, in one or more embodiments, the secondary feed vectors of the secondary feed nozzles may be oriented towards a point that is lower on the z-axis marker 210 than the location of the origin 212 (i.e. closer to the bottom of the reactor lower section 30). In these embodiments, the primary feed vector of the primary feed nozzle 60 may still be oriented towards the origin 212 (i.e. along the y-axis marker 208) or it may be oriented to a point that is lower on the z-axis marker 210 than the location of the origin 212 (i.e. it may form a vector lower on the z-axis 210 but parallel to the y-axis marker 208). The general orientations described in this paragraph may allow for an increase in the temperature around the area leading to the quench chamber 32, thereby facilitating smooth slag flow to the quench chamber 32.

In general, the placement of secondary feed nozzles are independent of each other and may be anywhere on the terminal ends 202 of the horizontal lower section 30 of the two-stage gasification reactor as long as the feed vectors of the feeds being introduced into the lower section 30 of the reactor meet at the feed intersection point (i.e., the origin 212). In some embodiments, a secondary feed vector 204a or 204b may form an angle with respect to the primary feed vector (i.e. y-axis marker 208) of about +/−1-45 degrees, or in some embodiments of about +/−5-30 degrees, and in yet further embodiments of about +/−10-20 degrees. Independent of the above consideration, a secondary feed vector 204a or 204b may form an angle with respect to the x-axis marker 206 of about +/−1-45 degrees, or in some embodiments of about +/−5-30 degrees, and in yet further embodiments of about +/−10-20 degrees. Also, a secondary feed vector 204a or 204b may form an angle with respect to the z-axis marker 210 of about +/−1-45 degrees, or in some embodiments of about +/−5-30 degrees, and in yet further embodiments of about +/−10-20 degrees. Further, the alignment of each particular feed vector may be substantially unrelated to the alignment of another secondary feed vector. However, in order to maintain the proper symmetry of the secondary feed vectors to obtain optimal flow conditions within the reactor, it may be necessary to align each secondary feed vector so that there is a complementary secondary feed vector that forms the opposite angle with respect to the coordinate system. For example, if there is one secondary feed nozzle that has a secondary feed vector that forms a 45 degree angle with respect to the primary feed vector (i.e. y-axis marker 208) then it may be beneficial for there to be another secondary feed nozzle that forms a −45 degree angle with respect to the primary feed vector (i.e. y-axis marker 208).

In one or more embodiments, it may be beneficial for attaining optimal feedstock flow conditions within the reactor if the flow of feedstock from one secondary feed nozzle 200a or 200b on one terminal end 202 is directly opposed by the flow of feedstock from another secondary feed nozzle (not shown) located on the opposite terminal end (not shown) of the lower section 30 of the gasification reactor (i.e., the two feedstock vectors form a straight line through the feed intersection point from one terminal end to the other). In one or more embodiments, each terminal end 202 of the lower section 30 of the gasification reactor may have the same number of secondary feed nozzles attached thereto, with each secondary feed nozzle having a feed vector that is directly opposed by another secondary feed nozzle's feed vector on the opposite terminal end of the lower section 30 of the gasification reactor. The above considerations regarding the feed vectors of the secondary feed nozzles may serve to provide optimal operating conditions for the gasification reactor by reducing the possibility for secondary liquid hydrocarbon feedstock spray contact or impingement upon the interior reactor wall surfaces, reducing any material disruption of the primary dried or slurried carbonaceous feedstock from the primary feed nozzles, and ensuring adequate temperature (e.g., above the ash fusion temperature of the feedstock ash) in the area around the reactor-lower section 30 leading to the quench chamber 32.

The dry or slurried carbonaceous feedstocks introduced into the lower reactor section by the primary feed nozzle may include lignite, sub-bituminous coal, bituminous coal, petroleum coke, char separated from the products of the upper section of the gasification reactor, and mixtures thereof. If the feedstock is a slurried carbonaceous feedstock, the carrier liquid for the carbonaceous materials therein may include water, liquid $CO_2$, petroleum liquid, or any mixture thereof. The liquid hydrocarbon feedstock introduced into the lower reactor section by the secondary feed nozzles may include pyrolysis oil, vacuum resid, pitch (including solvent deasphalted pitch), coal tar, phenolic materials from low-temperature gasification processes, solvent blowdown from acid gas removal units (AGRs), or mixtures thereof. The liquid hydrocarbon feedstocks may be described more specifically as follows: vacuum resid is high molecular weight/boiling point fraction of a refinery crude slate, pitch is high molecular weight/boiling point by-product of hydrocracking, phenolic materials are by-products created when cooling syngas from low-temperature gasification processes, and solvent blowdown streams from AGRs contain solvents (e.g., amines, glycols, methanol, etc.) and contaminants (e.g., BTX, tars, hydrocarbons, etc.) that require purging from the AGRs.

In some embodiments, the liquid hydrocarbon feedstock may be at most 10 percent, at most 20 percent, at most 40 percent, at most 60 percent, or at most 80 percent by weight of the total feedstock blend (i.e., dry or slurried feedstock and/or recycled dry char plus the liquid hydrocarbon feedstock) introduced into the lower section of the gasification reactor. In one or more embodiments, the secondary feed nozzles of the lower section of the gasification reactor may atomize the liquid hydrocarbon feedstock with nitrogen, recycled synthesis gas, air, oxygen enriched air, oxygen, steam, or mixtures thereof. Atomizing the liquid hydrocarbon feedstock being introduced into the lower section of the gasification reactor may be important to ensure optimal combustion of the total feedstock blend.

Embodiments of the present disclosure may provide at least one of the following advantages. Increasing the feedstock flexibility within a gasification process thereby increasing the capital efficiency and utility of a gasification reactor having the secondary feed nozzles described herein. Additionally, some of the liquid hydrocarbon feedstocks mentioned above may be generated by a facility that is unable to use those feedstocks. In these instances, the particular liquid hydrocarbon feedstocks may be collected and transported to another location for sale, use, or destruction. Embodiments, of the present disclosure may avoid the potentially risky and costly transportation of the liquid hydrocarbons and uncertain market conditions (if they are sold) by facilitating the internal use of these feedstocks in a gasification process/reactor disclosed herein. Further, in some embodiments, it may be possible to vary the amount of liquid hydrocarbon feedstock introduced into the lower section of a gasification reactor without requiring a reactor shutdown, thereby facilitating continuous operation of the gasification reactor if a reduction or increase in the liquid hydrocarbon feed is desired or if the liquid hydrocarbon stream becomes unavailable. Additionally, it is envisioned that the performance of existing gasification reactors may be able to be improved in the ways mentioned above by simply installing at least two secondary feed nozzles on the lower reactor body of the gasification reactor so that liquid hydrocarbon feedstocks may be introduced into the lower reactor body during the gasification process to supplement the feedstock provided by the primary feed nozzle.

Therefore, the present disclosure advantageously provides for the production by gasification of a high value product ($H_2$) by using low-value by-products (e.g. the liquid hydrocarbon feedstocks). Hydrogen is a high value product in a refinery setting because it is needed for various crude oil hydroprocessing operations, such as sulfur removal and hydrocracking. In contrast to the present disclosure, often hydrogen is generated in a refinery setting by reforming (consuming) a high value liquid or gas. The gasification processes disclosed herein can use lower value feedstock to produce hydrogen with the added flexibility to operate with a wider feedstock variety. In addition, the liquid hydrocarbon feedstock consumes comparatively less oxygen for a given amount of produced syngas than the solid dried or slurried carbonaceous feedstock, so complimenting the primary feedstock with the liquid hydrocarbon feedstock will serve to reduce overall oxygen consumption within the gasification reactor.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112(f) for any limitations of any of the claims herein, except for those in which the claim expressly uses the words 'means for' together with an associated function.

What is claimed:

1. A two-stage gasification reactor, comprising:
    a reactor lower section comprising:
        (a) a lower reactor body;
        (b) two primary feed nozzles, configured to introduce at least one of a dry feedstock or a first slurried feedstock, located on opposing terminal ends of the lower reactor body;
        (c) at least two secondary feed nozzles, configured to introduce a liquid hydrocarbon feedstock from a liquid hydrocarbon feedstock supply system, located on the lower reactor body; and
        (d) the liquid hydrocarbon feedstock supply system,
        (e) wherein at least one secondary feed vector of the at least two secondary feed nozzles forms an angle from +/−1-45 degrees with respect to a primary feed vector of the two primary feed nozzles, and at least one of the at least two secondary feed nozzles is not co-planar in a z-axis with the two primary feed nozzles, and
    a reactor upper section comprising:
        (a) an upper reactor body;
        (b) at least one upper feed nozzle, configured to introduce at least one of a dry feedstock or a first slurried feedstock, located on the upper reactor body; and
        (c) an outlet.

2. The two-stage gasification reactor of claim 1, wherein the at least two secondary feed nozzles are oriented so they provide feeds along secondary feed vectors that maintain a symmetry about the z-axis within the reactor lower section with feeds along primary feed vectors from the primary feed nozzles.

3. The two-stage gasification reactor of claim 1, wherein the at least two secondary feed nozzles and the primary feed nozzle are oriented so they provide feeds along feed vectors that intersect at a feed intersection point that is substantially in the center of the lower reactor body.

4. The two-stage gasification reactor of claim 1, wherein the at least two secondary feed nozzles are located on opposing terminal ends of the lower reactor body so that each terminal end possesses the same number of secondary feed nozzles.

5. The two-stage gasification reactor of claim 4, wherein each secondary feed vector of each secondary feed nozzle on one terminal end is oriented to form a straight line with a secondary feed vector from a secondary feed nozzle on the opposing terminal end.

6. The two-stage gasification reactor of claim 1, wherein at least one secondary feed vector from the at least two secondary feed nozzles forms an angle from about +/−1-45 degrees with respect to the z-axis of the reactor lower section.

7. A two-stage gasification reactor, comprising:
    a reactor lower section comprising:
        (a) a lower reactor body;
        (b) two primary feed nozzles, configured to introduce at least one of a dry feedstock or a first slurried feedstock from a feeding system, located on opposing terminal ends of the lower reactor body;

(c) at least two secondary liquid feed nozzles, configured to introduce a liquid hydrocarbon feedstock from a liquid hydrocarbon feedstock supply system, located on the lower reactor body; and (d) the liquid hydrocarbon feedstock supply system, (e) wherein at least one secondary feed vector of the at least two secondary feed nozzles forms an angle from +/−1-45 degrees with respect to a primary feed vector of the two primary feed nozzles, and at least one of the at least two secondary feed nozzles is not co-planar in a z-axis with the two primary feed nozzles, and a reactor upper section comprising:

(a) an upper reactor body;

(b) at least one upper feed nozzle, configured to introduce at least one of a dry feedstock or a first slurried feedstock, located on the upper reactor body; and (c) an outlet.

8. The two-stage gasification reactor of claim 7, wherein the at least two secondary feed nozzles are oriented so they provide feeds along secondary feed vectors that maintain a symmetry about the z-axis within the reactor lower section with feeds along primary feed vectors from the primary feed nozzles.

9. The two-stage gasification reactor of claim 7, wherein the at least two secondary feed nozzles and the primary feed nozzle are oriented so they provide feeds along feed vectors that intersect at a feed intersection point that is substantially in the center of the lower reactor body.

10. The two-stage gasification reactor of claim 7, wherein the at least two secondary feed nozzles are located on opposing terminal ends of the lower reactor body so that each terminal end possesses the same number of secondary feed nozzles.

11. The two-stage gasification reactor of claim 7, wherein each secondary feed vector of each secondary feed nozzle on one terminal end is oriented to form a straight line with a secondary feed vector from a secondary feed nozzle on the opposing terminal end.

12. The two-stage gasification reactor of claim 7, wherein at least one secondary feed vector from the at least two secondary feed nozzles forms an angle from about +/−1-45 degrees with respect to the z-axis of the reactor lower section.

13. The two-stage gasification reactor of claim 7, wherein the secondary liquid feed nozzles are configured to atomize the liquid hydrocarbon feedstock.

* * * * *